United States Patent [19]

Plummer et al.

[11] Patent Number: 4,786,964
[45] Date of Patent: Nov. 22, 1988

[54] ELECTRONIC COLOR IMAGING APPARATUS WITH PRISMATIC COLOR FILTER PERIODICALLY INTERPOSED IN FRONT OF AN ARRAY OF PRIMARY COLOR FILTERS

[75] Inventors: William T. Plummer, Concord; Hugh R. MacKenzie, Belmont, both of Mass.

[73] Assignee: Polaroid Corporation, Cambridge, Mass.

[21] Appl. No.: 9,934

[22] Filed: Feb. 2, 1987

[51] Int. Cl.[4] .................... H04N 9/077; H04N 5/335; H04N 9/04; G03F 3/08
[52] U.S. Cl. .................................. 358/44; 358/55; 358/75; 358/213.28
[58] Field of Search .................... 358/41, 43, 44, 213, 358/28, 55, 75

[56] References Cited

U.S. PATENT DOCUMENTS

| | | | |
|---|---|---|---|
| 4,085,421 | 4/1978 | Gilmour | 358/41 |
| 4,450,475 | 5/1984 | Ishikawa et al. | 358/44 |
| 4,477,832 | 10/1984 | Takemura | 358/44 |
| 4,517,603 | 5/1985 | Epsztein et al. | 358/213.28 |
| 4,575,193 | 3/1986 | Greivenkamp, Jr. | 358/55 |
| 4,605,956 | 8/1986 | Cok | 358/44 |
| 4,633,317 | 12/1986 | Uwira et al. | 358/213.28 |
| 4,652,928 | 3/1987 | Endo et al. | 358/213.28 |

FOREIGN PATENT DOCUMENTS

| | | | |
|---|---|---|---|
| 0120678 | 10/1984 | European Pat. Off. | 358/44 |
| 59-15377 | 1/1984 | Japan | 358/213.28 |
| 59-33978 | 2/1984 | Japan | 358/213.28 |
| 60-259074 | 12/1985 | Japan | 358/44 |
| 1441553 | 7/1976 | United Kingdom | 358/44 |

Primary Examiner—James J. Groody
Assistant Examiner—Randall S. Svihla
Attorney, Agent, or Firm—John J. Kelleher

[57] ABSTRACT

Apparatus for improving the quality of an electronic image generated by a charge coupled device (CCD) array that senses scene images through a colored optical filter. The apparatus includes a prism or prismatic filter movable into and out of the path of image-containing light rays impinging on the color filter overlying the CCD array that alternately shifts the scene image between color filters of the CCD array that absorb particular scene image colors and those that transmit these colors to their associated CCDs while in the case of the prismatic filter absorbing the dominant scene color generated by the colored optical filter. Scene image signals generated by a CCD array in this manner are processed such that their spatial relationship with respect to the sensed scene image is precisely monitored and electronically counter-shifted for subsequent scene image reconstruction. By shifting the scene image between individual CCDs having different color optical filters, most of the CCDs in the CCD array can generate image signals for two different scene colors or scene color combinations and thereby improve the image resolving capabilities and/or the color balance of electronic images generated by the CCD array.

6 Claims, 2 Drawing Sheets

ELECTRONIC COLOR IMAGING APPARATUS WITH PRISMATIC COLOR FILTER PERIODICALLY INTERPOSED IN FRONT OF AN ARRAY OF PRIMARY COLOR FILTERS

BACKGROUND OF THE INVENTION

The present invention relates to solid state image pick-up devices, in general, and to apparatus for improving the resolution and/or color balance of an image sensed by a photosensor array through a color optical filter in an electronic camera, in particular.

It is well-known to employ tricolor striped or mosaic-type optical filters in combination with a plurality of photosensors such as an array of charge coupled devices (CCDs) in an electronic camera for color image sensing purposes. The color component of the scene image is established by the optical filter and the CCD stores an electrical charge in proportion to the level of filtered scene light incident thereon. A tricolor optical filter of the type normally combined with a CCD array for color image sensing purposes might comprise the primary colors of red, green and blue in an additive process, or the primary colors of yellow, green and cyan in a subtractive process with the colors being regularly arranged on the CCD array in either stripe or mosaic form. Other additive and subtractive primary color combinations are also employed in a colored optical filter for such CCD array scene light filtering purposes.

A combination tricolor optical filter and CCD array generate electrical signals representative of a particular scene when an image of the scene is focused on said CCD array through said optical filter. In order to generate an electrical signal representative of any particular color present in a scene and imaged on a CCD array a group of three CCDs and their associated color filters that collectively include three primary colors must be employed. The term "primary colors" as employed herein means a set of colors from which all of the colors may be derived. As a consequence of this requirement, the ability of a combination tricolor filter and CCD array to resolve or distinguish between scene objects separated by small angular distances is limited by the area encompassed by the smallest three CCD combination in any given size CCD array.

If, for example, a tall and thin scene object such as a blue flag pole was imaged on a three CCD combination such as that mentioned above where each CCD in the combination included either a yellow, green or cyan subtractive filter, the CCD having its incident light filtered by a yellow filter would not "see" the blue flag pole because a yellow subtractive filter absorbs blue light and therefore does not allow blue light to reach its associated CCD element. The same would be true of the green filter and its associated CCD element. The only blue light to reach a CCD element through either a yellow, green or cyan filter of the three CCD combination mentioned above would be the blue light reaching the CCD associated with the cyan filter. Therefore, in this particular example two-thirds of the light sensing area associated with this three CCD combination and therefore two-thirds of the light being imaged on said three CCD combination cannot be employed to resolve an image of the above-mentioned tall and thin blue flag pole.

One obvious solution to this image resolution problem would be to increase CCD density or the number of CCDs per unit area within the same area covered by a lower density CCD array. While this approach may be effective in resolving most image resolution problems, a significant cost penalty would be incurred for the higher density CCD array which may render the device in which it is employed economically impractical.

In addition to the above-mentioned image resolution problem associated with the absorptive color filtering of scene light subsequently imaged on a CCD array, present CCD light filtering arrangements employ color filters that transmit a particular scene color more readily than other scene colors, thereby creating an imbalance or overly dominant color in an electronic image subsequently generated by such a CCD array. If, for example, one-third of the CCDs in a CCD array were filtered by either a subtractive yellow, green or cyan filter, green light would be transmitted to every CCD in the array, whereas red and blue light would be transmitted by only one-third of the CCDs in such an array.

One arrangement reported to have been employed by others to correct the above-noted color imbalance is the technique of moving a dominant color absorbing subtractive filter into and out of the path of the image-containing light rays impinging on an optically filtered CCD array during each CCD array exposure interval. An exposure interval is defined herein as a fixed period of time during which it is assumed that there will be no change in the scene to be imaged on a CCD array through a subtractive color filter. In one portion of an exposure interval (consisting of two separate exposures) all of the scene colors impinge on the tricolor optical filter. In another portion of the same exposure interval, the subtractive filter is inserted into the path of the image-containing light rays impinging on the optical filter which thereby blocks the dominant scene color and transmits less dominant scene colors to the tricolor optical filter. In this manner, the level of the less dominant scene colors sensed by the CCD are increased relative to the dominant scene color which results in an electronic image that is substantially more color balanced than one where a dominant color subtractive filter is not employed for such color balancing purposes. While this arrangement is effective for improving the color balance of a reconstructed image, it has no effect on the image resolving capabilities of the CCD array.

Therefore, it is a primary object of the present invention to improve the image resolving capabilities of a photosensor array that senses scene images through a colored optical filter.

It is another object of the present invention to improve the image resolving capabilities of a photosensor array that senses scene images through a colored optical filter without increasing the density of the photosensors forming said photosensor array.

It is a further object of the present invention to improve the image resolving capabilities of a photosensor array that senses scene images through a colored optical filter while at the same time improving the color balance of an electronic image subsequently generated by such an array.

Other objects, features and advantages of the present invention will be readily apparent from the following detailed description of the preferred embodiment thereof taken in conjunction with the accompanying drawings.

SUMMARY OF THE INVENTION

In accordance with the present invention, apparatus is provided for improving the quality of an electronic image generated by a photosensor array that senses scene images through a colored optical filter. In one embodiment, the apparatus includes optical means movable into and out of the path of image-containing light rays impinging on the color filters overlying the photosensor array that alternately shifts portions of the scene image between color filters of the photosensor array that absorb particular scene colors and those that transmit these colors to their associated photosensors during each photosensor array exposure interval. Scene image signals generated by the photosensor array in this manner are processed such that their spatial relationship with respect to the sensed scene image is precisely monitored and electronically counter-shifted for subsequent scene image reconstruction. By shifting the scene image in this manner, most of the scene sensing elements at the photosensor array are capable of generating image signals for two different scene colors or scene color combinations which thereby improves the image resolving capabilities of the photosensor array. In another embodiment, the optical means incorporates a color filter that absorbs the dominant color in the scene image each time it is moved into the path of the image-containing light rays during a portion of the above-noted exposure interval. Absorbing the dominant color in this manner improves the color balance of the subsequently reconstructed electronic image.

DESCRIPTION OF THE PREFERRED EMBODIMENTS

Figure 1:
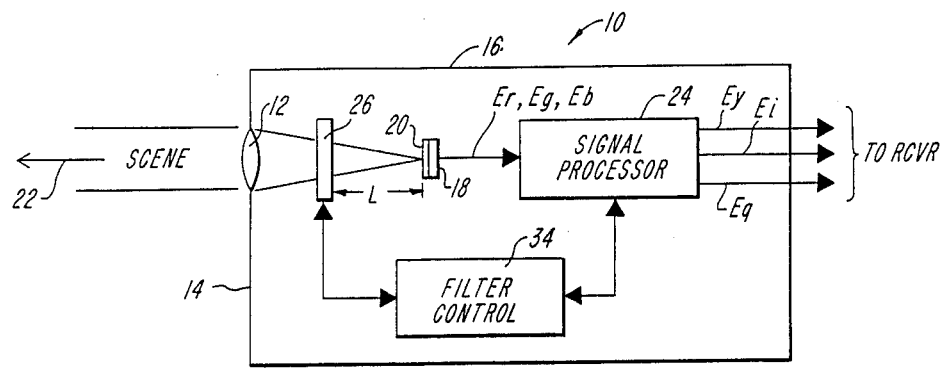
FIG. 1 is a schematic diagram of an electronic camera employing the electronic image quality improving apparatus of the present invention.

Referring now to FIG. 1 of the drawings, there is shown in diagrammatic form an electronic camera or solid state image pick-up device 10 incorporating a preferred embodiment of the electronic image quality improving apparatus of the present invention. Camera 10 includes objective lens 12 mounted in forward wall 14 of camera housing 16. Mounted within housing 16 in the optical path of image forming objective lens 12 is image sensing device 18 that is preferably a matrix array of charge coupled device (CCD) elements for providing electrical signals indicative of the intensity of scene light falling thereon. Tricolor optical filter 20 overlies the photosensitive surface of image sensing device or CCD array 18 and is therefore also in the optical path of objective lens 12. The function of tricolor optical filter 20 is to enable image sensing device or CCD array 18 to provide, in a conventional manner, separate output signals $E_r$, $E_g$ and $E_b$ representative of the primary colors present in scene 22 and imaged on CCD array 18 through combination tricolor optical filter 20 by image forming objective lens 12.

$E_r$, $E_g$ and $E_b$ signals generated by CCD array 18 are fed into signal processor or matrixing encoder 24 that digitizes and subsequently combines the three primary color signals into a composite luminance signal $E_y$ and then through selective matrixing of the $E_y$ signal with the separate primary color signals provides encoded chrominance information signals $E_q$ and $E_i$ in a manner that is analogous to the generation of encoded chrominance signals employed in conventional color television systems. A video signal consisting of luminance signal $E_y$ and chrominance information signals $E_q$ and $E_i$ provided by signal processor 24 is then fed directly to a video receiver (not shown) or to a video transmitter (not shown) for subsequent transmission to a video receiver.

In commercial color television broadcasting, for example, high resolution color signals $E_r$, $E_g$ and $E_b$ are generated in a video receiver from high resolution luminance information in combination with intentionally degraded relatively low resolution chrominance information utilizing signal processing techniques that are capable of reconstructing the colors in the original scene image. In the American television system, defined by the National Television System Committee (NTSC), the color television signal comprises a wide band (4 MHz) high resolution picture or luminance signal and two relatively low band (low resolution) chrominance signals $E_i$ (1.5 MHz) and $E_q$ (0.5 MHz) which are modulated on a subcarrier of approximately 3.6 MHz in the upper end of the 4 MHz wide picture channel. This scheme was developed after extensive tests indicated that the human eye perceives changes or transitions of luminance much more accurately than color transitions. Thus, by limiting the amount of chrominance information that is transmitted, many more television channels can be packed into the bandwidth allocated for transmission without materially degrading the quality of the subsequently reconstructed color image. At the receiving end of the system, the $E_i$ and the $E_q$ signals are matrixed with the the $E_y$ signal in a linear matrix to generate the three color signals $E_r$, $E_g$ and $E_b$ for driving the receiver display tube. Even though a substantial amount of the chrominance information is removed from the $E_i$ and the $E_q$ signals prior to transmission, the signals $E_r$, $E_g$ and $E_b$, which are regenerated at the receiver, have sufficient information to provide a picture that is perceived as a relatively high resolution color image.

As noted above, tricolor optical filter 20 overlies the photosensitive surface of CCD array 18 in the optical path of the scene image containing light rays that are focused by objective lens 12 on said CCD array 18. Each CCD in CCD array 18 has a single area or color portion of tricolor optical filter overlying its photosensitive surface with each of said color areas or portions being substantially the same size. Tricolor optical filter 20 may take either the mosaic form shown in drawing FIG. 2 or the striped form (not shown), with the mosaic form optical filter being preferred.

Any number of different light filtering schemes may be employed to filter light sensed by a CCD array n an electronic camera for the purpose of generating electrical signals representative of scene colors imaged on said CCD array. Aside from compatability with NTSC frequency and bandwidth standards, the particular light filtering scheme employed by an electronic camera manufacturer is selected as part of the system design process. Employing a particular filtering scheme in order to exploit the advantages associated with a particular filter design or to provide an optimum balance of signal-to-noise considerations often produces an imbalance between the relative amounts of light measured in the different scene colors.

Figure 2:
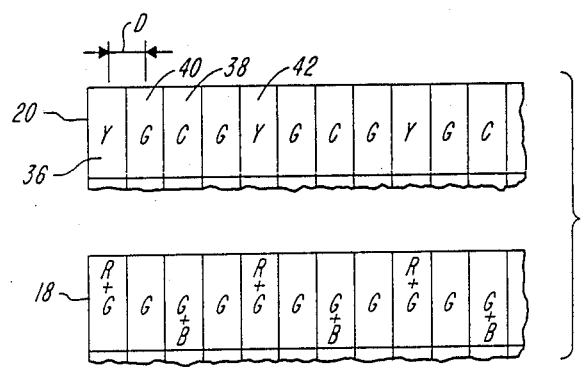
FIG. 2 is an enlargement of a portion of the mosaic filter and a portion of the CCD array of drawing FIG. 1 showing said filter vertically or upwardly spaced from said CCD array in order to facilitate describing these components.

One filtering scheme that produces the above-noted color imbalance is that shown in drawing FIG. 2. FIG. 2 is a greatly enlarged single horizontal row of CCDs and their associated optical filter that form a portion of CCD array 18 and optical filter 20, respectively, in drawing FIG. 1 where said optical filter 20 has been vertically (upwardly) displaced from CCD array 18 in order to facilitate describing the function of and the relationship between these components. Optical filter 20 in FIG. 2 is of the subtractive type and includes yellow (Y), green (G) and cyan (C) areas having the color, sequence and approximate shape shown in drawing FIG. 2. Scene light incident on CCD array 18 through subtractive filter 20 will be filtered in the following manner before being sensed by said CCD array 18. Scene light falling on the Y color areas of filter 20 will have its blue (B) component absorbed and have its red (R) and green (G) components transmitted to the CCD behind or associated with said Y color areas. Similarly, scene light falling on the G color areas of filter 20 will have its R and B color components absorbed and have its G color component transmitted to the CCDs associated with the G color areas. Also, scene light falling on the cyan (C) color areas of filter 20 will have its R color component absorbed and have its G and B color components transmitted to the CCD associated with said C color areas.

Employing a subtractive Y, G and C filter in the manner shown in drawing FIG. 2 results in a single dominant color or, in this particular light filtering scheme, an excessive amount of the color green being sensed by the associated CCD array. As shown in FIG. 2, every CCD senses the color green whereas the colors red and blue are sensed by only 25% of the CCDs or every fourth CCD in the CCD array. As a result of this reduction in sensitivity to red and blue colors, a color information imbalance may exist. Many other subtractive filter combinations will also produce a dominant color similar to that resulting from the Y, G and C filter combination discussed above with respect to drawing FIG. 2.

The present invention either minimizes or prevents this dominant color phenomenon by increasing the amount of scene light, in general, and the amount of the less dominant colors sensed by the CCD array relative to the dominant color, in particular. This dominant color imbalance is minimized or prevented by moving image-containing light rays focused by objective lens 12 between an area of optical filter 20 that normally absorbs a particular scene color and an area on filter 20 that transmits said particular color to its associated CCD in CCD array 18, after the dominant color has been temporarily removed, during each exposure interval. A preferred embodiment of this concept is shown in drawing FIG. 3.

Figure 3:
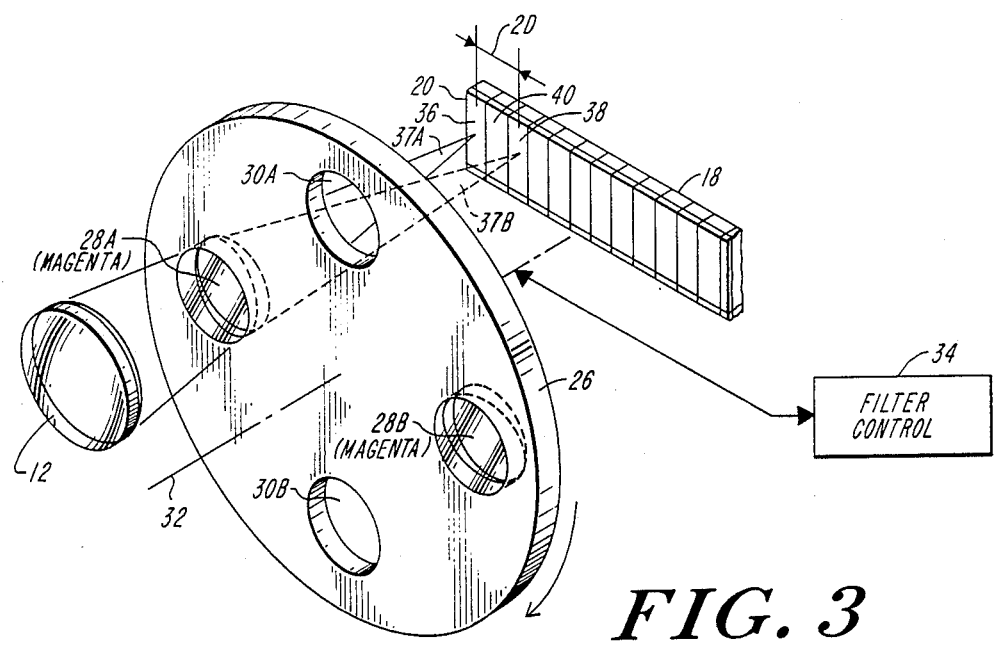
FIG. 3 is an enlargement, in perspective, of that portion of FIG. 1 consisting of the objective lens, the color wheel including two optical filters and a single horizontal row of colored areas in a multi-row mosaic-type tricolor optical filter from the combination optical filter and photosensor array shown in said drawing FIG. 1.

FIG. 3 is an enlarged perspective of that portion of FIG. 1 consisting of objective lens 12 and a single horizontal row of color areas in multi-row, mosaic-type, tricolor optical filter 20 together with its associated CCD array 18. FIG. 3 also includes filter wheel 26 rotatably mounted within electronic camera 10 in the optical path of objective lens 12 between said lens 12 and optical filter 20. While tricolor optical filter 20 is shown positioned between filter wheel 26 and CCD array 18, an alternate though less preferable arrangement would be to position filter wheel 26 between objective lens 12 and scene 22.

With reference to FIGS. 1, 2 and 3, filter wheel 26 includes a pair of subtractive, slightly prismatic magenta filters 28A and 28B, with each prismatic filter being mounted diametrically opposite one another on said wheel 26. Filter wheel 26 also includes a pair of circular openings 30A and 30B through wheel 26 that are also located diametrically across from one another. The centers of prismatic filters 28A, 28B and openings 30A, 30B are the same radial distance from axis of rotation 32 of rotatably mounted filter wheel 26 with said filters and openings being circumferentially spaced on a circular path having a radius equal to said radial distance and separated approximately 90° from one another.

Filter wheel 26 is rotated by filter control 34 on rotational axis 32 such that prismatic magenta filter 28A, 28B and openings 30A, 30B are alternately inserted into the image-containing light rays between objective lens 12 and color filter 20. As these prismatic magenta filters 28A, 28B are rotated through these image-containing light rays, the color green is absorbed by the magenta filter and the image formed by lens 12 and focused on optical filter 20 is horizontally or laterally moved a predetermined distance by these filters between filter areas of filter 20 that absorb particular scene colors and those that do not.

As explained above with respect to drawing FIG. 2, employing Y, G and C subtractive color filters results in the color green being the dominant color and the colors red and blue being considerably less dominant in the scene light measurement. Also, if blue scene light is focused on Y (minus blue) filter area 36 through opening 30A or 30B by lens 12 in direction 37A (FIG. 3) during one portion of an exposure interval, this blue light would be absorbed by Y filter area 36 and therefore could not be sensed by the CCD associated with said filter area 36. However, if this blue scene light is laterally redirected a total of two filter areas in direction 37B (FIG. 3) such that it falls on blue-light transmitting cyan filter area 38, this blue light will be sensed by the CCD associated with said filter area 38, thereby increasing the amount of blue scene light information that can be reproduced in a subsequently reconstructed scene image. If the distance between a point in Y filter area 36 and a corresponding point in immediately adjacent G filter area 40 in drawing FIG. 2 is equal to "D" and the distance from a prismatic filter in filter wheel 26 and array 18 (FIG. 1) is "L", it can readily be shown that the angular shift required to redirect blue-light containing light rays from filter area 36 to filter area 38 of optical filter 20 is 2D/L and that for an index of refraction of n=1.5 for prismatic filter 28A, 28B, the required prism angle of said prismatic filters 28A, 28B would be 4D/L, a small angle. As noted above, the color of subtractive prismatic filters 28A, 28B is magenta, which absorbs the color green. Therefore, when the light rays containing blue light are redirected from the yellow filter to the cyan filter by prismatic filters 28A, 28B, blue light will be transmitted to the CCD associate with said cyan filter without further increasing the amount of green scene light that is sensed by said cyan filter associated CCD. A similar process governs the sensing of red scene light by portions of CCD array 18. When light rays containing red scene light that would normally fall on cyan (minus red) filter 38 are redirected to yellow filter 42, red light will be transmitted to the CCD associated with said yellow filter without further increasing the amount of green scene light sensed by said yellow filter associated CCD. For this particular subtractive filtering and light redirecting scheme, any red or blue scene light falling on a green filter area such as filter area 40, will not be sensed by a CCD associated therewith because the red and blue light would be redirected to another green (red and blue light absorbing) color filter.

Prismatic filters 28A, 28B and openings 30A, 30B on or through filter wheel 26 rapidly shift scene image containing light rays back and forth between filter areas that are laterally displaced from one another. The rate at which these light rays are displaced must be fast enough to avoid blurring of the subsequently reconstructed scene image. This rate of movement can be controlled by the rate of rotation of filter wheel 26 by filter control 34 and/or the number of prismatic filters on and openings through filter wheel 26. Even though two prismatic filters and two openings are employed in or through filter wheel 26, the number of such filters and openings can be more or less than this number as dictated by the image blurring considerations mentioned above. In addition, and as shown in drawing FIG. 4, a reciprocating prismatic filter may also be employed for scene light-ray displacement purposes. However, the rotating prismatic filters and openings in color wheel 26 is preferred. Prismatic filter 44 in FIG. 4, translatably mounted on aperture block 46, would be moved from the position shown in solid lines to the position shown in dashed lines where it would overlie aperture 48. Aperture 48 would be interposed between objective lens 12 and combination CCD array 18 an optical filter 20 in electronic camera 10 of drawing FIG. 1 and said prismatic filter 44 would perform the same light ray displacing function as prismatic filters 28A, 28B in drawing FIG. 3. The primary disadvantage associated with the light ray displacing apparatus of FIG. 4 is the slower rate at which it is able to displace scene image containing light rays.

During each exposure interval, the CCDs in CCD array 18 perform two separate light sensing operations. In that portion of the exposure interval where the prismatic filter has no effect on light rays imaged on CCD array 18, the CCDs sense scene light and then transmit electrical signals representative of this scene light directly to signal processor 24 (FIG. 1) for temporary storage. After these signals have been stored in signal processor 24, the output of each CCD in CCD array 18 is reduced to zero or cancelled. In another portion of the same exposure interval, after the outputs of all of the CCDs in CCD array 18 have been positively reduced to zero, and after the prismatic filter has displaced the image-containing light rays as described above, CCDs in CCD array 18 generates another electric signal representative of the same scene image and once again transmits these signals to signal processor 24. It should be noted that here is never any direct mixing of these two sets of signals in CCD array 18. After these two sets of signals have been received by signal processor 24, they are, in effect, electrically rearranged so that they will be placed in the proper location relative to one another and to the original scene image before being transmitted to a receiver for subsequent scene image reconstruction. Inasmuch as the CCDs in CCD array 18 generate two sets of signals for each scene image, it is essential that these signals be constantly tracked or monitored by signal processor 24 for the above-noted rearranging purposes, or otherwise they will appear to have come from two different scene image locations that are physically displaced from one another.

Figure 4:
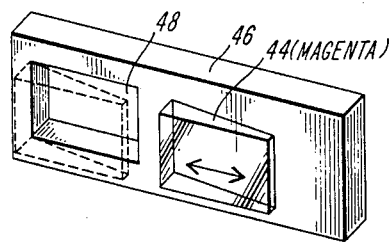
FIG. 4 depicts reciprocating optical apparatus that may be substituted for the preferred scene image shifting optical apparatus shown in drawing FIG. 3.

It should also be noted that if a plain prism was substituted for the prismatic filters in FIGS. 3 or 4, improved color resolution of the electronic image generated by CCD array 18 would result even though there would be no improvement in color balance with such an arrangement. By displacing the image-carrying light rays with a plain or non-light absorbing prism, many CCDs in CCD array 18 that would normally not sense a particular color because of it being absorbed by its associated optical filter would be able to sense said particular color when it is redirected to a filter area where it would not be so absorbed. In such an arrangement, the signal processing by signal processor 24 in FIG. 1 would be the same as the signal processing in the arrangement where a prismatic filter is employed.

It will be apparent to those skilled in the art from the foregoing description of our invention that various improvements and modifications can be made in it without departing from its true scope. The embodiments described herein are merely illustrative and should not be viewed as the only embodiments that might encompass our invention.

What is claimed is:

1. Electronic imaging apparatus for producing an enhanced image of a scene comprising:

an array of photosensitive elements, with each of said elements producing an electrical signal indicative of the intensity of light incident thereon;

an array of primary color filters, with each of said filters having a respective one of at least three given primary colors, said filter array being fixedly positioned in an overlying relationship to said photosensitive element array such that each of said filters is operably associated with a respective one of said photosensitive elements, and said filter array in its entirety being structured to normally pass light which is weighted in favor of one of said given primary colors;

means for focusing image-carrying light rays from a scene onto said photosensitive element array through said filter array;

means for causing light rays from each of a plurality of areas of said scene to pass through a first respective one of said filters onto the associated photosensitive element to produce a first electrical signal representative of the corresponding scene area, and for subsequently causing said light rays from each of said plurality of scene areas to pass through a filter element interposed in front of said filter array, said filter element being structured to filter out said one of said given primary colors, and then causing said filtered light rays from each of said plurality of scene areas to be redirected to pass through a second respective one of said filters onto the associated photosensitive element to produce a second electrical signal representative of the corresponding scene area, said second respective filter being structured to filter out any primary color other than said one of said given primary colors which is passed by said first respective filter; and means for at least temporarily storing said first and second electrical signals representative of each of said plurality of scene areas, whereby the stored signals may be later manipulated to produce an enhanced image of said scene.

2. The apparatus of claim 1 wherein each of the photosensitive element in said array of photosensitive elements is a charge-coupled device.

3. The apparatus of claim 3 wherein the colors of the colors filters in said array of primary color filters are yellow green and cyan.

4. The apparatus of claim 3 wherein said filter element interposed in front of said filter array is a prismatic magenta filter of the subtractive type.

5. The apparatus of claim 4 wherein said prismatic magenta filter is mounted for rotation on a wheel having an opening therethrough with said filter and said opening being alternately interposed in front of said filter array.

6. The apparatus of claim 4 wherein said prismatic magenta filter is mounted for translation on a support member having an opening therethrough overlying said filter array with said filter being periodically interposed in front of said filter array.

* * * * *